US008825689B2

(12) United States Patent
Fedorenko et al.

(10) Patent No.: US 8,825,689 B2
(45) Date of Patent: Sep. 2, 2014

(54) METHOD AND SYSTEM FOR MATCHING UNKNOWN SOFTWARE COMPONENT TO KNOWN SOFTWARE COMPONENT

(75) Inventors: Igor Fedorenko, Toronto (CA); Vlad Tatavu, Toronto (CA); Jamie Whitehouse, Guelph (CA); Brian Edward Fox, Goffstown, NH (US)

(73) Assignee: Sonatype, Inc., Fulton, MD (US)

( * ) Notice: Subject to any disclaimer, the term of this patent is extended or adjusted under 35 U.S.C. 154(b) by 0 days.

(21) Appl. No.: 13/476,160

(22) Filed: May 21, 2012

(65) Prior Publication Data

US 2013/0311496 A1    Nov. 21, 2013

(51) Int. Cl.
G06F 17/30    (2006.01)

(52) U.S. Cl.
CPC ................ *G06F 17/30017* (2013.01)
USPC ........................................... 707/758

(58) Field of Classification Search
USPC .......... 707/758, 899; 717/100, 101, 121, 122
See application file for complete search history.

(56) References Cited

U.S. PATENT DOCUMENTS

| 5,615,400 | A  | 3/1997  | Cowsar et al. |
| 6,167,535 | A  | 12/2000 | Foote et al. |
| 6,282,698 | B1 | 8/2001  | Baker et al. |
| 6,931,544 | B1 | 8/2005  | Kienhofer et al. |
| 7,080,355 | B2 | 7/2006  | Carlson et al. |
| 7,149,734 | B2 | 12/2006 | Carlson et al. |
| 7,159,206 | B1 | 1/2007  | Sadhu et al. |
| 7,322,024 | B2 | 1/2008  | Carlson et al. |
| 7,343,386 | B2 | 3/2008  | Gomes et al. |
| 7,506,312 | B1 | 3/2009  | Girolami-Rose et al. |
| 7,644,101 | B2 | 1/2010  | Yano |
| 7,707,162 | B2 | 4/2010  | Naphade et al. |
| 7,735,068 | B2 | 6/2010  | Siddaramappa et al. |
| 7,788,632 | B2 | 8/2010  | Kuester et al. |
| 7,810,087 | B2 | 10/2010 | O'Brien |
| 7,814,078 | B1 | 10/2010 | Forman et al. |
| 7,844,592 | B2 | 11/2010 | Shoval et al. |
| 7,877,391 | B2 | 1/2011  | Bird et al. |
| 8,060,871 | B2 | 11/2011 | Bernabeu-Auban et al. |
| 8,069,182 | B2 | 11/2011 | Pieper |
| 8,104,018 | B2 | 1/2012  | Chessell et al. |
| 8,156,092 | B2 | 4/2012  | Hewett et al. |
| 8,156,120 | B2 | 4/2012  | Brady |
| 8,161,470 | B2 | 4/2012  | Bottomley et al. |

(Continued)

OTHER PUBLICATIONS

Siobhan Clarke et al., Verifying components under development at the design stage: A Tool to support the composition of component design models, 1998, Google, 3 pages.*

(Continued)

*Primary Examiner* — Jean B Fleurantin
(74) *Attorney, Agent, or Firm* — Posz Law Group, PLC

(57) ABSTRACT

A computer system or method identifies components. A component fingerprint storage is configured to memorize known fingerprints of known components. The term "component" used herein is defined to be a specific version of pre-existing executable software, or a reusable pre-existing self-contained software code building block which is not a complete stand-alone finished product ready for use and which is binary or source code. A fingerprint is generated for a normalized unknown component and fingerprints are generated for all normalized components included in the unknown component. It is determined whether any of the fingerprints generated for the normalized unknown component and for the normalized components included in the unknown component match any of the known fingerprints of known components.

15 Claims, 7 Drawing Sheets

(56) References Cited

U.S. PATENT DOCUMENTS

| | | | |
|---|---|---|---|
| 8,280,755 B2 | 10/2012 | Stuhec et al. | |
| 8,296,251 B1 | 10/2012 | Athayde | |
| 8,356,278 B2 | 1/2013 | Drissi et al. | |
| 8,359,285 B1 | 1/2013 | Dicker et al. | |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1 | 7/2013 | Kawashima et al. | |
| 8,499,284 B2 | 7/2013 | Pich et al. | |
| 8,543,979 B2 | 9/2013 | Arcese et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0149717 A1 | 7/2006 | Bird et al. | |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0089086 A1 | 4/2007 | Ortloff | |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028378 A1 | 1/2008 | Biswas et al. | |
| 2008/0127040 A1 | 5/2008 | Barcellona | |
| 2008/0154965 A1 | 6/2008 | Pedersen | |
| 2008/0229300 A1 | 9/2008 | O'Brien | |
| 2008/0263505 A1 | 10/2008 | StClair et al. | |
| 2008/0270374 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0138843 A1 | 5/2009 | Hinton et al. | |
| 2009/0144698 A1 | 6/2009 | Fanning et al. | |
| 2009/0300404 A1 | 12/2009 | Branson et al. | |
| 2009/0307662 A1 | 12/2009 | Ackerman | |
| 2010/0023919 A1 | 1/2010 | Chaar et al. | |
| 2010/0023920 A1 | 1/2010 | Chaar et al. | |
| 2010/0058295 A1 | 3/2010 | Johnson et al. | |
| 2010/0100543 A1 | 4/2010 | Brady | |
| 2010/0153920 A1 | 6/2010 | Bonnett | |
| 2010/0211924 A1 | 8/2010 | Begel et al. | |
| 2010/0306730 A9 | 12/2010 | Carlson et al. | |
| 2010/0333067 A1 | 12/2010 | Goh et al. | |
| 2011/0023016 A1 | 1/2011 | Khader et al. | |
| 2011/0055186 A1 | 3/2011 | Gopalakrishnan | |
| 2011/0066619 A1 | 3/2011 | Perantatos et al. | |
| 2011/0107301 A1 | 5/2011 | Chan et al. | |
| 2011/0137807 A1 | 6/2011 | Cha | |
| 2011/0145810 A1 | 6/2011 | Forsyth | |
| 2011/0258162 A1 | 10/2011 | Lam | |
| 2011/0289098 A1* | 11/2011 | Oztaskent et al. | 707/769 |
| 2011/0307862 A1 | 12/2011 | Abrams et al. | |
| 2011/0314438 A1 | 12/2011 | Surazski et al. | |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0159420 A1 | 6/2012 | Yassin et al. | |
| 2012/0246616 A1 | 9/2012 | Frontiero et al. | |
| 2012/0272205 A1* | 10/2012 | Fox et al. | 717/101 |
| 2012/0311534 A1 | 12/2012 | Fox et al. | |
| 2012/0317546 A1 | 12/2012 | Arcese et al. | |
| 2012/0324419 A1 | 12/2012 | Roberts et al. | |
| 2012/0331439 A1 | 12/2012 | Zimmermann et al. | |
| 2012/0331447 A1 | 12/2012 | Nayak et al. | |
| 2013/0007704 A1 | 1/2013 | Haynes et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0074038 A1 | 3/2013 | Fox et al. | |
| 2013/0191808 A1 | 7/2013 | Fox et al. | |
| 2013/0212562 A1 | 8/2013 | Fox et al. | |
| 2013/0227517 A1 | 8/2013 | Fox et al. | |
| 2013/0326469 A1 | 12/2013 | Fox et al. | |
| 2014/0026121 A1 | 1/2014 | Jackson | |
| 2014/0075414 A1 | 3/2014 | Fox et al. | |

OTHER PUBLICATIONS

Mili et al., Storing and Retrieving Software Components: A Refinement Based System, 1994, IEEE, 91-100.*
U.S. Appl. No. 13/744,542, filed Jan. 18, 2013, Fox et al.
U.S. Appl. No. 13/780,525, filed Feb. 28, 2013, Fox et al.
Cubranic et al., "Hipikat: Recommending Pertinent Software Development Artifacts," 2003, Proceedings of the 25$^{th}$ International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Notice of Allowance issued by the U.S. Patent Office on Jan. 22, 2013 in connection with related U.S. Appl. No. 13/089,751.
U.S. Appl. No. 13/554,335, filed Jul. 20, 2012, Jackson et al.
Gacek, "Exploiting Domain Architectures in Software Reuse", 1992, ACM 0-89791-739- 1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21$^{st}$ International conference on Industrial, Engineering and Other Applications of Applied Intelligent Systems: New Frontiers in Applied Artificial Intelligence, 2008, pp. 189-198.
U.S. Appl. No. 13/962,122, filed Aug. 8, 2013, Fox et al.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
Milanovic et al., "Model & Metamodel, Metadata and Document Repository for Software and Data Integration", 2008, MoDELS 2008, LNCS 5301, pp. 416-430, 2008.
Sherman Steven, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Notice of Allowance issued by the U.S. Patent Office on Mar. 15, 2013 in connection with related U.S. Appl. No. 13/483,412.

(56) References Cited

OTHER PUBLICATIONS

U.S. Appl. No. 13/861,065, filed Apr. 11, 2013, Fox et al.
Office Action issued by the U.S. Patent Office on Apr. 8, 2013 in connection with related U.S. Appl. No. 13/151,816.
Ji et al., "Efficient Interactive Fuzzy Keyword Search", WWW 2009, Apr. 20-24, 2009, ACM 978-1-60558-487-4/09/04, pp. 371-380.
Happel et al., "Potentials and Challenges of Recommendation Systems for Software Development", RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Office Action issued by the U.S. Patent Office on Apr. 9, 2013 in connection with related U.S. Appl. No. 13/231,162.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
Sourceforge, List of Current OSS Discovery Fingerprints [online] [retrieved on May 27, 2012] Retrieved from the internet: <http://ossdiscovery.sourceforge.net/fingerprints.html>.
Sourceforge, OSS Discovery FAQ [online] [retrieved on May 27, 2012] Retrieved from the internet: <http://ossdiscovery.sourceforge.net/faq.html>.
U.S. Appl. No. 13/089,751, filed Apr. 19, 2011, Fox et al.
U.S. Appl. No. 13/151,816, filed Jun. 2, 2011, Fox et al.
U.S. Appl. No. 13/231,162, filed Sep. 13, 2011, Fox et al.
U.S. Appl. No. 13/233,265, filed Sep. 15, 2011, Fox et al.
U.S. Appl. No. 13/369,617, filed Feb. 9, 2012, Fox et al.
U.S. Appl. No. 13/483,412, filed May 30, 2012, Fox et al.
Office Action issued by the U.S. Patent Office on Oct. 2, 2013 in connection with related U.S. Appl. No. 13/554,335.
Google, classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006. pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and the Written Opinion of the International Searching Authority mailed on Oct. 15, 2013 by the International Searching Authority in connection with international application No. PCT/US2013/041785, which corresponds to related U.S. Appl. No. 13/476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+rep1&type=pdf>, entire document.
Chilowicz et al. Syntax tree fingerprinting: a foundation for source code similarity detection. Sep. 29, 2011. [Retrieved on 2013-26]. Retrieved from the Internet: <URL:http://hal-upec-mlv.archives-ouvertest.fr/docs/00/62/78/11/PDF/HAL.pdf>, entire document.
U.S. Appl. No. 14/140,167, Dec. 24, 2013, Fox et al.
Final Office Action issued by the U.S. Patent Office on Feb. 25, 2014 in connection with related U.S. Appl. No. 13/554,335, all pages.
Office Action issued by the U.S. Patent Office on Mar. 10, 2014 in connection with related U.S. Appl. No. 13/233,265, all pages.
Gall et al., "Visualizing software release histories: the use of color and third dimension," IEEE International Conference on Software Maintenance, 1999 (ICSM '99) Proceedings, pp. 99-108.

* cited by examiner

METHOD AND SYSTEM FOR MATCHING UNKNOWN SOFTWARE COMPONENT TO KNOWN SOFTWARE COMPONENT

TECHNICAL FIELD

The technical field relates in general to software development, and more specifically to providing information about software components used in software development.

BACKGROUND

Identifying components that are incorporated into software applications can be problematic. Typically applications today are built using various components and are not written from scratch. All software developers, in whatever language and platform, whatever methodology, will realize that there is some software that they do not want to write and that already exists. What frequently happens is that software developers will use software components directly, e.g., from a repository. Identifying the unknown component that was used as-is directly from a repository is very easy because the entire file can be fingerprinted (such as by hashing) and if the hashes are the same then it is known that the entire file is the same.

What also is common is that software developers modify these components in subtle ways. For example, the components might be recompiled from the original source to make them compliant with licensing. When that is done, there is a subtle change when considering the file as a whole (such as due to the compiler time stamp) even through the functional contents are essentially the same. Another example is the OSGI (Open Services Gateway Initiative) framework for Java, in which additional metadata is added to the components themselves to make them work in certain environments. In an OSGI situation, 99.9% of the contents may be the same as the original source. However, even a minor change will result in a different hash and thus a determination that the files are not the same.

SUMMARY

Accordingly, one or more embodiments provide a computer system. The computer system includes a component fingerprint storage configured to memorize known fingerprints of known components; and a processor cooperatively operable with the component fingerprint storage. The processor is configured for generating a fingerprint for an unknown component and fingerprints for all components included in the unknown component. The processor is also configured for determining whether any of the fingerprints generated for the unknown component and for the components included in the unknown component match any of the known fingerprints of known components.

An embodiment further generates the known fingerprints of known components and then storing the known fingerprints in the component fingerprint storage.

In another embodiment, the fingerprints are hash values.

Yet another embodiment normalizes the unknown component and all of the components included in the unknown component, before generating the fingerprints for the unknown component and the components included in the unknown component.

In another embodiment, for each of the components in the unknown component, before normalizing the component, a type of the component and a normalization process associated with the type of the component are determined. The component is normalized according to the normalization process determined to be associated with the type of the component.

In still another embodiment, the normalization process for a component which is determined to be a Java type performs the following: set class version to 0, reset synthetic class access flags, set outer class name to null, set constant pool and inner class list in alphabetical order, reset final access flag of Java enumerations #values method, remove all synthetic member fields and Java methods, and remove all package names.

Another embodiment includes preparing a matching confidence value based on matching of the unknown component and all of the components included in the unknown component to any of the known fingerprints, wherein the matching confidence value expresses a level of confidence that the unknown component and a known component which is associated with a matched one of the known fingerprints are the same.

A further embodiment is a computer-implemented method for identifying a component, according to one or more of the above embodiments.

Still another embodiment is a non-transitory computer-readable medium comprising instructions for execution by a computer, the instructions including a computer-implemented method for providing a method for identifying a component, the instructions for implementing the method in a processor.

Yet another embodiment is a system, computer-readable storage medium, or a computer-implemented method for generating a universal fingerprint for a Java component. The following are performed, in this order: (1) for a Java component, in a processor, normalizing the Java component according to a Java normalization process to provide a normalized Java component; and (2) generating, in the processor, the fingerprint for the normalized Java component, as a universal fingerprint. The fingerprint is a hash value. The Java normalization process performs the following on the Java component: setting class version to 0, resetting synthetic class access flags, setting outer class name to null, setting constant pool and inner class list in alphabetical order, resetting final access flag of Java enumerations #values method, removing all synthetic member fields and Java methods, and removing all package names.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
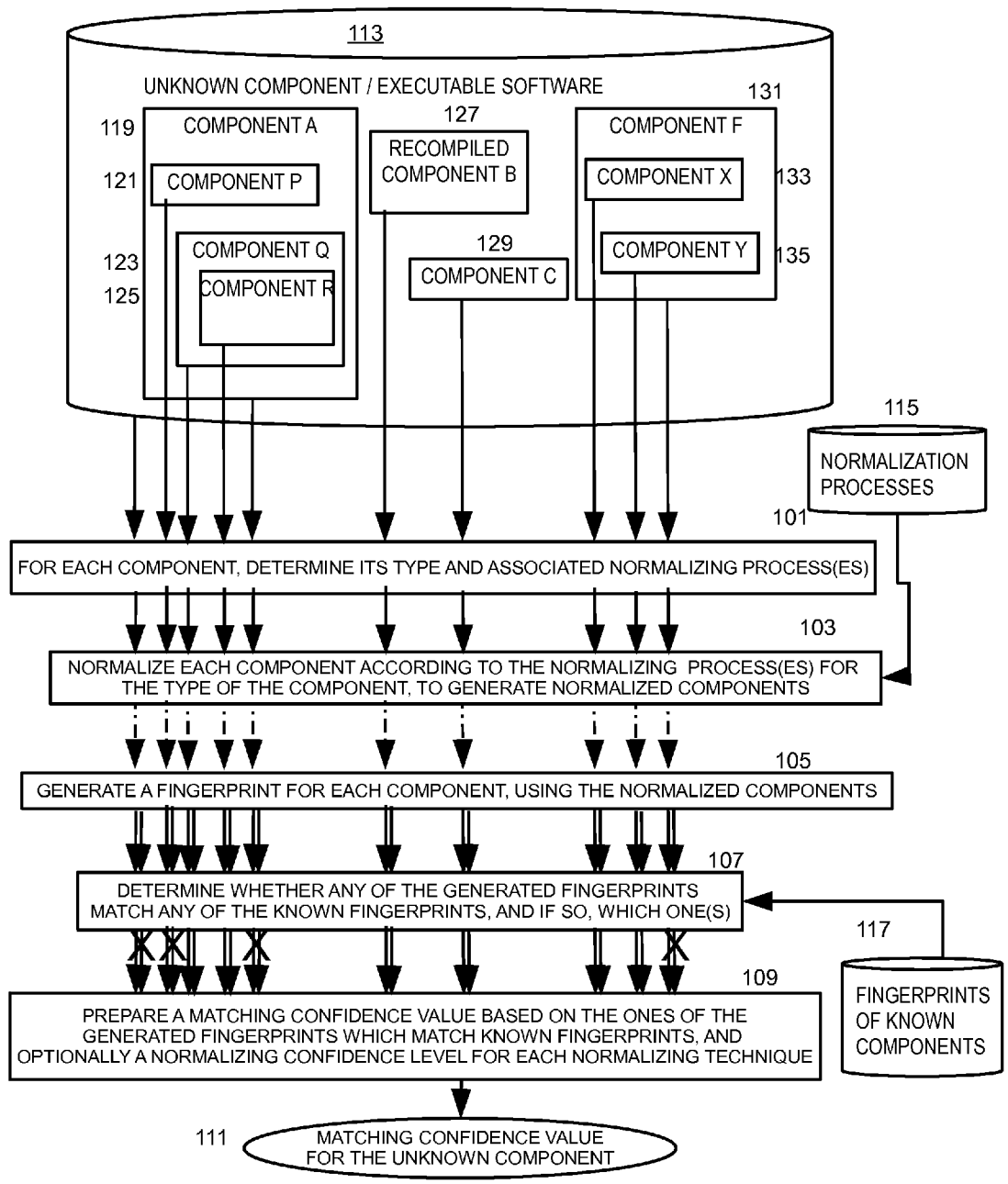
FIG. 1 is a data flow diagram illustrating evaluating an unknown component for a match.

In overview, the present disclosure concerns software development, in which software code building blocks, sometimes referred to as binary or source code, or generally software "components", which are stand-alone pre-determined self-contained pieces of code, can be used as one of plural building blocks in a complete piece of software, which itself may be a "component". Even though a software component might be changed during the process of developing a piece of software, when it is included as part of a complete piece of software it may be desirable to identify the components within the complete piece of software as being essentially the same as a known component. More particularly, various inventive concepts and principles are embodied in systems, devices, and methods therein for evaluating a software component, and components within the software component, to determine whether it matches an already known component.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms which are defined to have the following meanings for the purpose of the claims herein. Other definitions may be specified in this document.

The term "component" used herein is defined to be a specific version of pre-existing executable software, or a reusable pre-existing self-contained software code building block which is not a complete stand-alone finished product ready for use and which is binary or source code. A component is the subject of a license or a target of a security vulnerability. Less formally, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "repository" or "software repository" used herein are defined to mean an electronic storage system that stores software build components (sometimes referred to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifact. A repository can be remote or local.

The term "software build" used herein specifically is defined to mean a process as pre-defined in an executable build program of converting a plurality of components (sometimes obtained from a repository) and combining the results into an executable stand-alone computer program or a software component for use in a further software build, including at least compiling components and linking compiled components and possibly binary components (which can be from the repository), in a pre-determined order as defined in the build program.

The term "compiler" is used herein specifically to mean a computer program(s) that transforms source code written in a programming language into a target language that is readable by a computer, often in the form of binary code or bytecode, so as to create an executable program.

<End of Definitions>

The inventors faced the problem of finding a way to determine whether the contents of the components are the same or almost the same as another known component, so as to be able to report to a user (1) that this known component is being used, and/or (2) that this component has certain license obligations and/or potential security vulnerabilities, or other associated metadata. The fact that the component has been modified does not change the fact that it is subject to a copyleft license or that it has known security vulnerabilities. It is still relevant even through the components are not identical, they are effectively the same.

Consequently, a solution is to identify the component at a more granular level than just at the file level. In this solution, domain-specific logic can be applied to the contents of the file, so that the system can understand the semantic meaning of the file, so even though the file being evaluated may be slightly different and have a different hash, a user can know that the file is essentially the same.

Instead of merely evaluating the outer file, depending on the file type the system looks inside the file. For example, if the file is an archive, the system can look inside the archive and look at each of the archive entries. Furthermore, again depending on the type of the component, the system can apply additional domain logic that is applicable to that particular file type. For Java, the system applies certain pre-determined bytecode normalizations so as to be able to identify files that semantically are identical. By way of explanation, it can be noted that actual bytecode instructions can be slightly different depending on factors involved in how the files were compiled, how they were post-processed by certain tools, or similar. Normalizing individual components to account for, e.g., compiler and/or build "noise" can allow the system to tell that non-identical files are actually the same or came from the same source or are very close to being the same source.

In this discussion, the term "unknown component" is used to refer to a component which is to be evaluated (as disclosed herein) to determine whether it appears in the library of known component fingerprints. The term "known component" is used to refer to a component which was previously evaluated and for which a fingerprint is stored in the library.

In overview, one or more embodiments can normalize the file to be evaluated (referred to as the "unknown component"), which can include determining how to normalize the unknown component based on the type of the file and doing the same for every component included in the file down to the innermost component, then producing the fingerprints for the file and its components; and comparing the fingerprints from the file against the known set of fingerprints. Then, a confidence value can be determined which indicates how confident the system is that the file (including its internal components) and the known components are the same.

As further discussed herein below, various inventive principles and combinations thereof are advantageously employed to evaluate and identify components such as third party code included in a software application. The components such as third party code can come from public software component repositories, like The Central Repository (from Sonatype), or elsewhere, from which a library of known component fingerprints can be generated. The library of known component fingerprints can be searched for a match of the fingerprint of the unknown component.

Further in accordance with exemplary embodiments, there is provided a method and system for identifying third party code which is included in files. A software application can be viewed as a collection of files. Files can include other files, as is the case with ZIP archives. Files can have subelements, for example, a Java class file can be viewed as a collection of member fields and functions.

In an exemplary embodiment, for each application file which needs to be identified, the system can calculate a SHA1 hash of the file contents and, depending on the file type, a number of SHA1 hashes of normalized file contents. Each hash function can be assigned a match confidence level, e.g., a number between 0 and 100. For example, an SHA1 of the entire file contents can be considered to have confidence of 100, while additional hashes can have lower confidence depending on the level of normalization performed on the component or sub-component before hashing.

For files with recognized subelements, e.g., a Java class, the system can calculate SHA1 hashes of the normalized subelement contents.

File content normalization processes can be performed which is specified to the different types of components (files and subelements) before calculating the hash of the file. The following are examples of file normalization processes:

Text Files
replace all sequences of whitespace characters with a single space character. XML files
remove whitespace nodes
convert to UTF-8 (UCS Transformation Format—8 bit) character encoding
Java Files
Class version set to 0. Class version varies depending on-target Java compiler parameter. Setting to 0 makes the class version compiler-independent.
Reset synthetic class access flags. Different Java compilers set these flags differently. Resetting the flags makes the class access compiler-independent.
Set 'outer' class name to null. Different Java compilers set this attribute differently. Setting to null makes the outer class name compiler-independent.
Sort constant pool and inner class list in alphabetical order. Pack and unpack (e.g., pack200/unpack200) change the constant pool and inner class list order. <The pack200 tool is a known Java application that transforms a JAR (Java archive) file into a compressed pack200 file using the Java gzip compressor. The pack200 files are highly compressed files that can be directly deployed> <unpack200 is a known tool that decompresses a packed file produced by pack200 into a JAR file.> Packing and unpacking makes the constant pool and inner class list compiler-independent.
Reset 'final' access flag of Java enumerations #values method. Different Java compilers set this flag differently. Resetting this flag makes it compiler-independent.
Remove all synthetic member fields and methods. Again, this removes compiler dependent information.
Remove all package names. This normalization compensates for Java classes 'relocation' performed by the maven-shade-plugin.

A database of known hashes can be calculated from components such as customer application files located by crawling public software component repositories, like The Central Repository.

Hashes of customer application files can be calculated and matched against the database of known software hashes. Each application file is matched individually first, starting with matching individual file subelements, where applicable. If a match is found, it is assigned a score based on match confidence of the hash function used to calculate the hash. Matching score of archive files is calculated based of matching score of individual files included in the archive.

Scores above a certain threshold indicate that customer application likely includes the matching known software component.

The data flows are illustrated herein by way of example to further understanding of the principles discussed here. Actual implementations can omit one or more portions of the data flows, and/or can include other data flows which are within the scope and spirit of the discussion herein.

Figure 2:
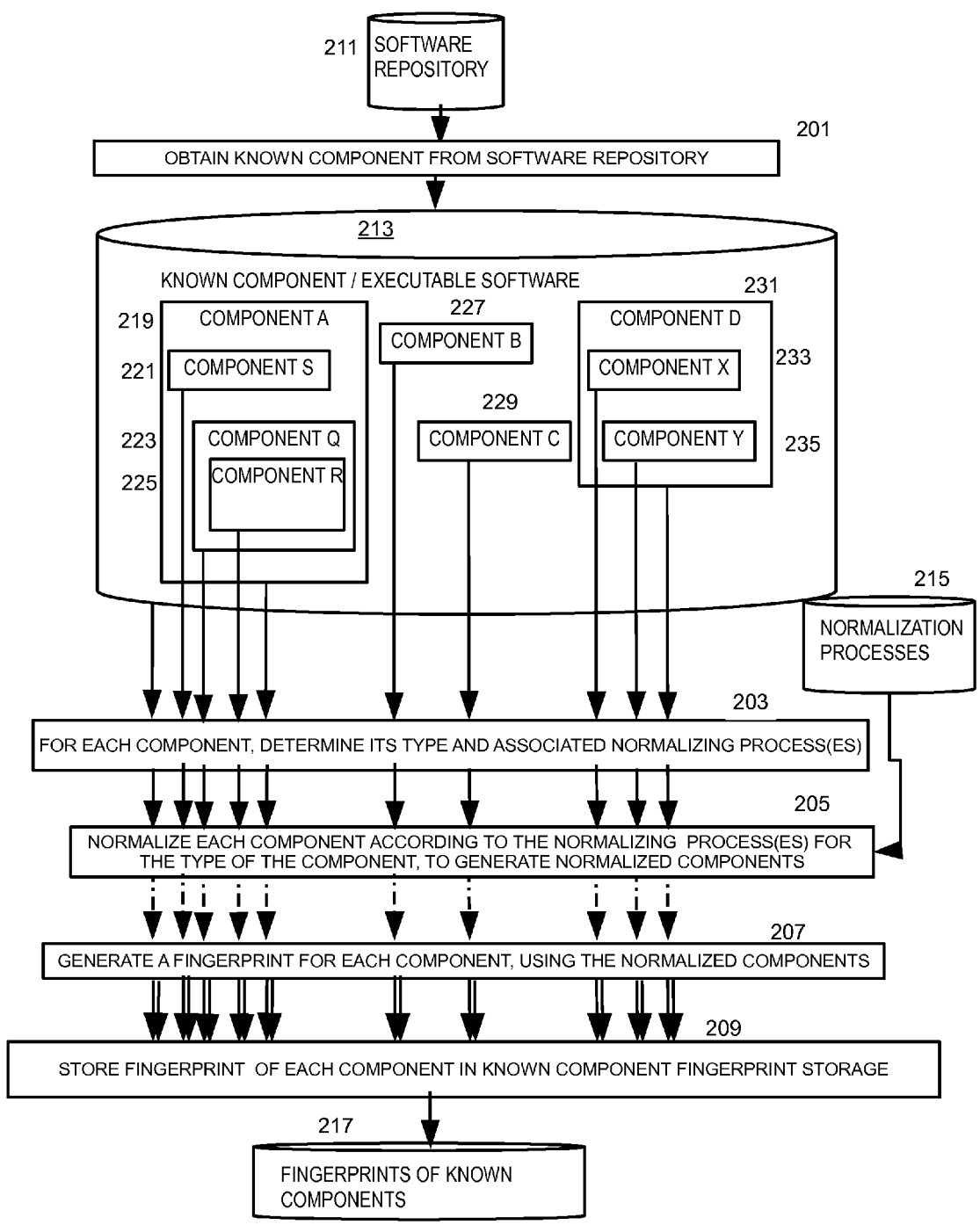
FIG. 2 is a data flow diagram illustrating adding a fingerprint of a known component to a dataset of known fingerprints.

FIG. 1 and FIG. 2 are both data flow diagrams. FIG. 1 illustrates a data flow for evaluating and attempting to identify a component using a fingerprint of the component, and FIG. 2 illustrates a data flow for storing information in the library of known fingerprints. An overview of the processes of FIG.

1 is first provided, followed by a more detailed discussion of variations. Then, an overview of FIG. 2 and a subsequent detailed discussion thereof are provided.

Referring now to FIG. 1, a data flow diagram illustrating evaluating an unknown component for a match will be discussed and described. In FIG. 1, the data flow generally provides normalizing and generating a fingerprint 101, 103, 105 for each part of an unknown component 113 which is to be evaluated; and then finding a match for the fingerprint 107. The data flow related to each component is illustrated by respective vertical lines, the top of which is connected to the component to which it pertains. Optionally, a matching confidence value is scored 109. These are discussed in more detail below.

In this illustration, the unknown component 113 which is to be evaluated happens to be an executable software application. Those of skill in the art will appreciate that the unknown component includes a variety of other components which were incorporated by the software developers, perhaps open source files, class files, libraries, executable code that was recompiled, code that was patched, OSGI framework elements, archive files that contain other components, and perhaps original elements as well, and the like. In this illustration, these are components represented by component A, recompiled component B, component C, component F, components P-R, component X and component Y 119, 121, 123, 125, 127, 129, 131, 133, 135. A component can be included within another component, in this illustration, components X and Y are inside component F 131, 133, 135; component R is inside component Q (and thus is inside component A) 119, 123, 125; components P and Q are inside component A 119, 121, 123; and all of these components are inside the unknown component 113. Naturally, before any of the components is matched it needs to be evaluated; however, for each of description in this example, we will use the same name for the component before and after matching is performed.

Briefly, the illustration shows that, for each component, its type is determined and the normalization process 115 associated with that type is determined 101. Each component is individually evaluated, because they may each have a different type. For example, component A may be a ZIP file, and recompiled component B may be a Java file. As part of this, files which contain other files (e.g., a ZIP file) are opened and the components therein are also normalized, etc. Here, there is an associated normalizing process determined for each component: the unknown component. component A, recompiled component B, component C, component F, components P-R, component X and component Y 113, 119, 121, 123, 125, 127, 129, 131, 133, 135.

After identifying the normalization process to be used for each component, each component is normalized 103 by the associated normalization process 115, which results in normalized components. The normalization process is intended to remove information that may be added during software development that does not materially affect the semantics of the file, or may otherwise obscure the file contents or file data. A variety of normalization processes 115 can be provided, with one or more for each different type of file that is expected to be evaluated. Here, there is generated a normalized component corresponding to each component, illustrated by the vertical dotted line: the unknown component. component A, recompiled component B, component C, component F, components P-R, component X and component Y 113, 119, 121, 123, 125, 127, 129, 131, 133, 135.

After the component is normalized, a fingerprint is generated for each normalized component based on the normalized contents 105. Here, each there is a fingerprint generated for each normalized component, represented by the vertical double line: the unknown component. component A, recompiled component B, component C, component F, components P-R, component X and component Y 113, 119, 121, 123, 125, 127, 129, 131, 133, 135.

Details of normalizing and generating fingerprints are further discussed in a subsequent section.

After a fingerprint is generated, a match is attempted to be located 107 in the library 117 of fingerprints of known components. Either the fingerprint will match one of the known components, or it won't. Here, for each component, there is an indication provided as to whether or not the fingerprint of a normalized component matched a fingerprint in the library. In this case, there was no match (indicated by the "X" on the vertical double line) for: the unknown component, component P, component A, and component F 113, 119, 121, 131; and there is a match for: recompiled component B, component C, component Q, component R, component X and component Y 123, 125, 127, 129, 133, 135.

The components with fingerprints that are matching in the library 117 correspond to those known components that were listed in the library. Having identified these components as the same, these components will have the same issues, such as license, support, security, and the like. This means also that the unknown component will have those same issues.

It can be appreciated that the normalization process for the recompiled component B 127 in this example removed any data introduced by the recompilation, since the fingerprint of normalized recompiled component B was located in the fingerprint library 117. The fingerprint of normalized component A 119 was not located in the fingerprint library 117, likely because component A 119 includes component P 121 which also did not match any fingerprint in the fingerprint library. If component A had previously been encountered, all of its internal components would also have been recorded in the library. The fingerprint of component F 131 was not located in the library 117, despite all of its internal components, here represented by components X and Y 133, 135, having fingerprints that are matched in the library 117. Perhaps component F 131 was patched or was changed to a different framework than its original.

Details of fingerprint matching are discussed in a subsequent section.

Then a matching confidence value can be prepared 109 based on the fingerprints of the normalized that matched fingerprints in the fingerprints library 117. Based on the normalization technique that was used, the confidence value can be enhanced (for example, where the entire file was hashed) or penalized (for example, where merely the file signature was hashed).

In addition, the matching confidence value can consider whether the component contains fingerprints that match a known component that contains the same fingerprints. For example, component F 131 contains matched fingerprints for component X and component Y; thus component F might match (with a lower matching confidence value) a known component that also contains component X and component Y (illustrated as component D2 31 in FIG. 2). Similarly, unknown component 113 might be considered to be approximately matched to the known component 213 of FIG. 2 because some of the internal fingerprints are matched; the score for the matching confidence value can reflect the number of matched fingerprints and unmatched fingerprints, and optionally the normalization processes that were used.

Similarly, if component A 119 is simply an archive, it will not match because one of its internal components does not match (here, component P 121). If component A is simply an archive, its failure to match should not affect the matching confidence value because that would amount to double-counting the failure to match component P.

Then, the matching confidence value 111 for the unknown component can be provided. Optionally, information regarding the matches for the internal components can be provided as well.

A detailed discussion regarding scoring of the matching confidence value is provided in a subsequent section.

Normalizing and Generating Fingerprints

Often, in some cases, the system is able to look further inside files. For Java class files, for example, the system can look at individual members of the class and again apply the same approach discussed herein. The file is normalized and hashes of individual members inside the file are calculated, and those hashes can be compared to the database of known member hashes that were previously collected.

Any hash function technique can be used. Well known hash techniques include SHA-1, MD5, and many others that will map an input data set of variable length and output a small data set, sometimes referred to as a hash value, hash code, hash sum, check sum, or hash.

The hash function is not important as long as the same technique is used to hash the file being evaluated and the known file to which it is compared. The file that is input to the hash function is normalized so that the input is the same despite differences, some of which are subtle, that are injected as part of the process of developing code.

The system can be useful with compiled files. On a source file, some normalization can be done to identify, e.g., end-of-line characters that may be different (depending on the editor implementation) in the bit file that will be hashed but do not affect the semantics of the file contents. For XML files and unformatted files, normalization is applied to adjust for characters and/or white space nodes. It is expected that files which are reviewed are most often compiled applications. In a compiled application that is being evaluated, the system is trying to compare two components which have been modified by, e.g., a compiler and trace them back to determine that these two apparently different components likely originated from the same source code.

With regard to compilers, running a compiler at a different time or with a slightly different set of parameters or running a different compiler or a compiler with a different set of parameters, on the same source code, can yield a slightly different set of bytecode. Also, the compiled code might include a portion of bytecode that is random and essentially different every time the code is compiled. A compiler is obliged to generate exactly the same code for the same input, but even different versions of the same compiler can generate slightly different code for identical input.

Two components can be different while being the same semantically, for example, the same source has been through different compiler versions or the same compiler with different options. That two components are "semantically" the same means that the bytecodes, although different, were compiled from exactly the same source or using same compiler or with different options, or different versions of the same compiler, and/or using the same or different build tools. To this point, the mere fact of re-compiling changes an outer archive's hash due to the changed time stamp. One question to be answered in the matching is whether the two components being compared are different compiles of the same source. The normalizing process is intended to mitigate such differences which are created as a by-product of the usual course of implementing software.

One or more normalization techniques can look for cases where the individual class files and contents themselves are slightly altered, and/or where the bulk of the archive itself is the same with some subtle changes such as when a file was patched or a manifest is added. As discussed below, the system can say with some confidence that these different outer files are the same, when every other component in the respective files is identical.

The system further can associate the normalization process with a confidence value, so that the system can rank the quality of the match developed from the normalization process.

The normalization process which is selected and performed can be dependent on the detected content of the file, and there are a set of normalization algorithms which can be done. For example, to normalizes text files, the system can remove the white space, line endings, etc. For Java files, a number of specialized things are done to normalize the bytecode. The system can normalize other types of components, e.g., .net components. The approach can be similar, i.e., to ascertain and remove information added by the .NET compilers to the semantically functional parts of the code.

A variation is to compile known source code to provide compiled source code, and then compare the resulting output of the known compiled source code to the unknown compiled component.

The system can determine which kind of normalization to do based on the file type (e.g., the file extension as confirmed by the file contents) of the subcomponent.

In normalization, a first step is identifying the type of file and a next step can be to normalize the file. The system knows what types of components represent archives. If a component is determined to be an archive, then it contains other components; the component that is an archive is opened up and the process is performed on the components contained in the archive. If the component is a Java class file, a bytecode normalization for Java or for a Java class file is applied. If the component is a text file, the system performs a text file normalization. The system walks down the tree until it has files which are not archive files and then the system handles the individual files. An "Archive file" is defined herein as a file type that is known to contain other files. Examples of an "Archive file" are a zip file, a JAR file, and the like.

One or more normalization processes can be used on a component, to generate respective one or more hashes for a single component.

A hash function is performed on each normalized component, including the file to be evaluated as a whole, each component within the file to be evaluated, each component within one of the components, and so on (each, a "subcomponent"). The hash function generates fingerprints.

Matching

The system can check whether there is an exact match between fingerprint of any known component and the fingerprint of the unknown component (or subcomponent). Even if the unknown component as a whole has a matching fingerprint, the system still evaluates the interior components of the unknown component for matching fingerprints. There is a small possibility of a false positive match of just the unknown component as a whole, and moreover there may be security or license implications of the internal component that may not have been noted with respect to, e.g., the executable component package.

A known component can have a provenance because it may have been retrieved from source, such as a software repository, for example, The Central Repository, or other structured storage that associates the component with its license(s), build settings and environment, contributor, and/or which may be able to associate the component with vulnerabilities, security updates and the like. Once the unknown component (or its subcomponents) is matched to a known component, the unknown component can be associated with the provenance of the known component (and its subcomponents) and hence the issues related to provenance (e.g., licenses, security, etc.) can be addressed in the unknown component.

Even if there is a perfect match at the outer file level, there are matches at the subelement which are relevant as well (e.g., archive or class file, etc.). So, fingerprints are generated and matches are determined for the unknown component at all of these levels (innermost file subelements, all file sub-elements, and the unknown component overall).

Any known or to-be-developed techniques can be used for comparing hash values and attempting to locate a matching hashed value.

Scoring the Match Confidence

To score the match, the system can look at the unknown component as a hierarchy, and the system can drill inside the unknown component and evaluate the individual JAR files (more generically, archive files) or components within the distribution. When a component is an archive file, the system can drill down to look at individual entries within the component, so as to evaluate the individual sub-elements of those entries. At each level, the system can calculate the hashes and can compare those hashes to the database library of known hashes.

Certain normalizations lose more information about the input component than the others. For example, one normalization process for Java class files is to remove all bytecode from the component and only keep information about method names and their parameters, that is, just the file signature. The hash that is calculated when this normalized component is used (i.e., using just the file signature) is based on a reduced amount of information; this can have a lower match confidence than a hash that was calculated based on more information (even if normalized) or based on the entire non-normalized component. Thus, the system can weight the score based on the type of the normalization function that was used, with those normalization process that lose more information about the input component being weighted lower than the other normalization process that do not lose more information.

For each component that is to be evaluated, the system can use the inner most elements. For example, for Java classes, the system can look at, e.g., individual methods and can calculate matched confidence at that level. Then, for each individual Java method the system can have a number of hashes calculated, so the system can find the matched hash with the highest confidence. The system can aggregate this information up at the class file level (which is a collection of methods and members and member fields). There, the system can calculate total confidence of all the elements and weight this by the number of elements. Then, this is aggregated up to the level of individual application archive files (or JAR files).

When the system determines whether a known archive is the same as the unknown archive, the system can consider both sides to this comparison. That is, the scoring can consider how many matched components are in the known archive vs. in the unknown archive. An unknown archive in which 99% of its components match a known archive is more likely to match the known archive, with perhaps a minor variation such as caused by a patch to one element.

In a variation, the system can use a text file that is a sub-component of the unknown component, to boost the overall matching score when the fingerprint of the text file component is matched.

In another variation, the system can provide one or more potential matches and associated confidence values for the unknown component. In a variation, the system can provide the potential match(es) and confidence values for components inside the unknown component. In a variation, the potential matches can be limited to those with a confidence value over a predetermined threshold value.

Referring now to FIG. 2, a data flow diagram illustrating adding a fingerprint of a known component to a dataset of known fingerprints will be discussed and described. In FIG. 2, the data flow generally provides for obtaining a known component 213, normalizing and generating a fingerprint 201, 203, 205, 207 for each part of the known component 211; and then storing 209 the fingerprint into the library of fingerprints of known components 217. The data flow related to each component is illustrated by respective vertical lines, the top of which is connected to the component to which it pertains. These are discussed in more detail below.

In this illustration, the known component 213 which is to be evaluated also happens to be an executable software application, and a variety of other components which were incorporated by the software developers, as discussed above. In this illustration, these are components represented by components A-D, components Q-S, component X and component Y 219, 221, 223, 225, 227, 229, 231, 233, 235. Components X and Y are inside component D 231, 233, 235; component R is inside component Q (and thus is inside component A) 219, 223, 225; components S and Q are inside component A 219, 221, 223; and all of these components are inside the known component 213.

After the known component is obtained, its type and the type of each component inside the known component is determined and the associated one of the normalization processes 215 for each component is determined 203. This can be the same as described in connection with FIG. 1. Then, each of the components can be normalized 205 by the one (or more) of the normalization processes for the type of the component, to generate normalized components. This can be the same as described in connection with FIG. 1. Next, a fingerprint is generated 207 for each of the normalized components. This also can be the same as described in connection with FIG. 1. Finally, the generated fingerprints of the normalized components can be stored 209 in the library 217 of fingerprints of known components, optionally together with information so that the original of the known component can be located.

Other known components can be obtained and the data flow can be repeated for the other known components. Additional discussion follows regarding the creation of the library of fingerprints of known components.

Creating the Library:

The source of known components can be, e.g., anywhere on the internet, or software repository, or internal commercial artifacts, or open source, or proprietary (such as intranet), a database, web crawling, or anywhere. The Central Repository is a convenient example of a repository of known components, which are Open Source and are specifically intended to be reused by software developers. However, the known components can be obtained from anywhere. The known components can provide master components from which a dataset of known fingerprints is developed, to which the fingerprints of unknown components are compared.

The library/data set of known fingerprints of known components uses the same normalization and fingerprinting process described above. Consequently, the same file being input as an unknown component will result in a matching fingerprint.

The library/data set of known fingerprints of known components can be stored using conventional techniques, such as in a database which is local, remote and/or distributed. The fingerprints/hashes stored therein can be search using known techniques. Moreover, the known fingerprints stored in the dataset of known fingerprints can include an indication (such as a pointer or address) of the provenance of the component that resulted in the known fingerprint. For example, a known fingerprint that originated in an open source repository can include sufficient information to locate that particular version of the component in the open source repository, together with any build, license and/or security information that is provided in the open source repository.

The fact that there is no match for an unknown component does not mean that it is necessarily unique. For example, the unmatched unknown component may be a copy of something that was distributed in another mechanism that was not used in creating the library.

In an embodiment, a fingerprint for an unknown component that does not match anything in the storage can be added to the storage for future matching against new unknown components (since the unknown component has already been encountered). For example, if a web crawler is used to develop the dataset of known component fingerprints, it is possible that something is first encountered as an unknown component prior to being added to the library from the web crawler. A fingerprint for an unmatched unknown component can be used to supplement the library.

Figure 3:
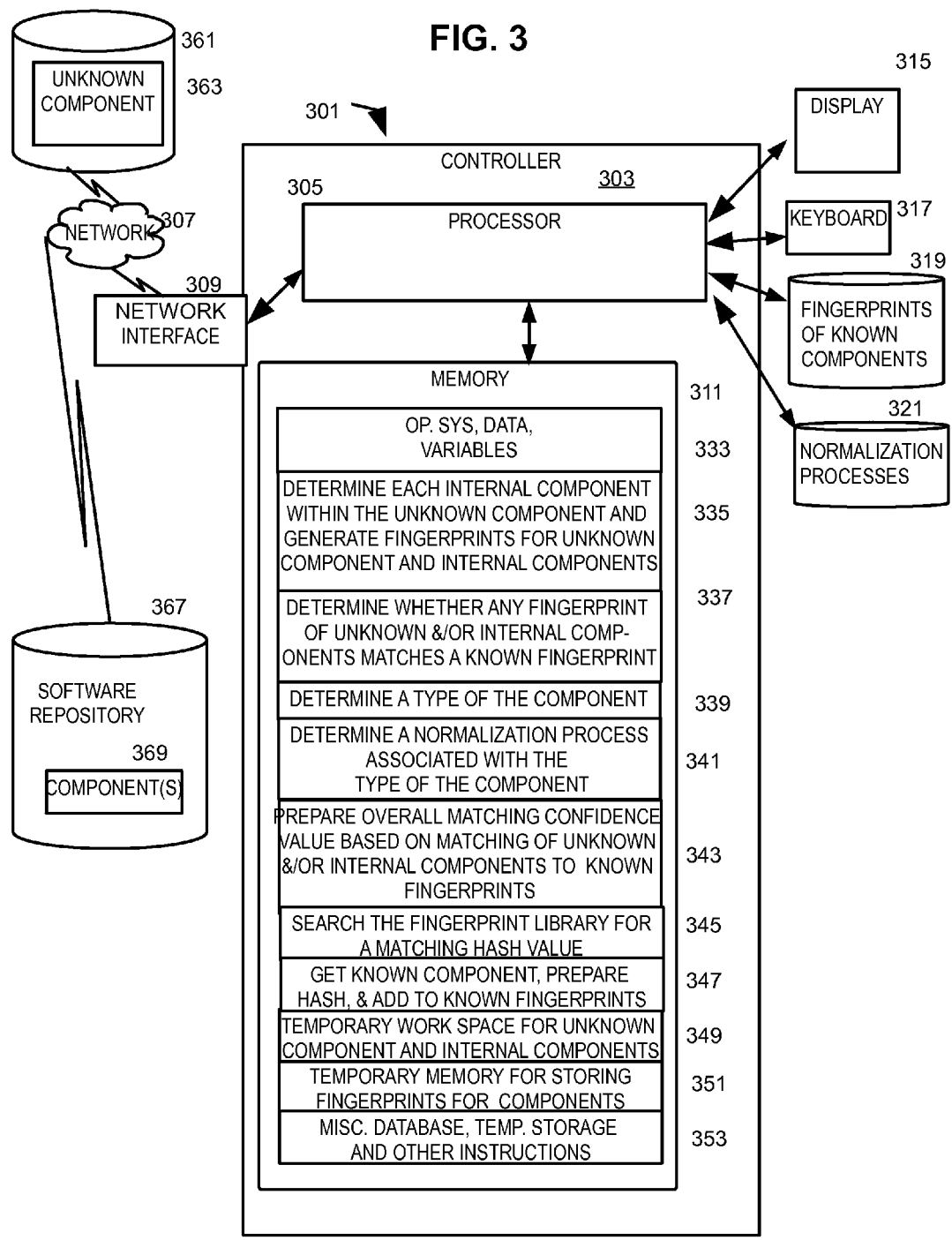
FIG. 3 is a block diagram illustrating relevant portions of a computer system.

Referring now to FIG. 3, a diagram illustrating relevant portions of a computer system will be discussed and described. The computer 301 may include one or more controllers 303, a processor 305, a network interface 309 for communication with a network 307, a memory 311, a display 315 (optional), and/or a user input device such as a keyboard 317. Alternatively, or in addition to the keyboard 317, a user input device may comprise one or more of various known input devices, such as a keypad, a computer mouse, a touchpad, a touch screen, a trackball, and/or a keyboard. The display 315 may present information to the user by way of a conventional liquid crystal display (LCD) or other visual display, and/or by way of a conventional audible device (e.g., a speaker) for playing out audible messages. Portions of the computer 301 are well understood to those of skill in this area and have been omitted to avoid obscuring the discussion.

The processor 305 may comprise one or more microprocessors and/or one or more digital signal processors. The memory 311 may be coupled to the processor 305 and may comprise a read-only memory (ROM), a random-access memory (RAM), a programmable ROM (PROM), and/or an electrically erasable read-only memory (EEPROM). The memory 311 may include multiple memory locations for storing, among other things, an operating system, data and variables 333 for programs executed by the processor 305; computer programs for causing the processor to operate in connection with various functions such as to determine 335 the internal components within the unknown component and generate fingerprints for each unknown and internal component, determine 337 whether the fingerprints of the unknown and internal component matches a known fingerprints, determine 339 a type of the component, determine 341 a normalization process associated with the type of the component, prepare 343 an overall matching confidence value for the unknown component, search 345 the fingerprint library for a match, get 347 a known component and add its fingerprint to the library; a temporary work space 349 for the unknown component and its internal components; a temporary memory 351 for storing fingerprints; and a database 347 for other information and/or instructions used by the processor 305. The computer programs may be stored, for example, in ROM or PROM and may direct the processor 305 in controlling the operation of the computer 301. Each of these functions is considered in more detail herein, to the extent that it is not detailed elsewhere in this document.

The user may invoke functions accessible through the user input device such as the keyboard 317. The user input device may comprise one or more of various known input devices, such as a keyboard (317, illustrated) and/or a pointing device, such as a mouse; the keyboard 317 may be supplemented or replaced with a scanner, card reader, or other data input device; and the pointing device may be a mouse, touch pad control device, track ball device, or any other type of pointing device.

The display 315 is representative of a display that may present information to the user by way of a conventional liquid crystal display (LCD) or other visual display, and/or by way of a conventional audible device for playing out audible messages.

Responsive to manual signaling from the user input device represented by the keyboard 317, in accordance with instructions stored in memory 311, and/or automatically upon receipt of certain information via the network interface 309, the processor 305 may direct the execution of the stored programs.

The computer 301 can access a software repository 367 on which is stored one or more components, here represented by component(s) 369, which is representative of one or more masters for preparing the library 319 of fingerprints of known components; and the computer 301 can access an unknown component 363, illustrated here as being located in database 361 accessed over the network 307. Although the components and unknown component 363, 369 are illustrated as accessed over the network 307, the components and/or unknown component 363, 369 may be remotely and/or locally accessible from the computer 301, over a wired and/or wireless connection; the components and unknown component 363, 369 do not need to be limited to a database or a software repository. An example of the software repository 367 is The Central Repository, available at Sonatype. Techniques are known for accessing components located in a software repository 367, and for accessing components located in databases 361, files, and the like.

The processor 305 may be programmed to determine 335 the internal components within the unknown component and generate fingerprints for each unknown and internal component. A file can be determined to be an "archive file", i.e., composed of one or more files and metadata that can indicate file directory structure among other things. As used herein, the designation "archive file" indicates archive files that may (or may not) include compression, be used for software packaging and distribution, and document packaging and distribution. A non-exhaustive list of extensions for archive files includes .zip, .cfs, .rar, .sitx, .7z, .tar, .jar, .war, .pkg, .deb, .msi, and the like. The internal components of a component that is an archive file can be determined using known techniques, such as the file directory indicated in the archive file. Each of the internal components from an archive file can itself be examined to determine whether there is another layer of internal components. Once the archive file directories and internal components have been exhaustively examined, all of the internal components within the unknown component are located. Optionally, the computer 301 can provide a temporary work space 351 for the unknown component and respective internal components. A fingerprint can be generated for the unknown component and for each of its internal components, and internal components of its internal components.

The processor 305 may be programmed to determine 337 whether any of the fingerprints of the unknown and/or internal components matches a known fingerprint in the library of fingerprints of known components 319 (sometimes referred to as the "known fingerprint library). Conventional techniques can be used to compare the fingerprints and attempt to locate a matched fingerprint in the known fingerprint library 319.

The processor 305 may be programmed to determine 339 a type of the component. When provided a component, this function can determined its type using known techniques. For example, the file extension may indicate the file type, and the file contents will confirm the file type when the file contents are appropriate for the file type.

The processor 305 may be programmed to determine 341 a normalization process associated with the type of the component. Different normalization processes 321 can be stored separately, if desired. The one or more normalization processes associated with the file type are used on the component to generate a normalized component. Normalization is discussed elsewhere in more detail.

The processor 305 may be programmed to prepare 343 an overall matching confidence value for the unknown component, based on the matching and not matching of the unknown component and its internal components with respect to the known fingerprints. The scoring of the confidence value is discussed elsewhere in this document in more detail.

The processor 305 may be programmed to search 345 the fingerprint library for a match. That is, given a fingerprint for the unknown component or its internal components, the known fingerprint library 319 can be searched using conventional techniques to determine which, if any, of the known fingerprints stored in the fingerprint library 319 is a match. If the fingerprints match, then the known and unknown components that were input to the hash were the same.

The processor 305 may be programmed to get 347 a known component and add its fingerprint to the library. The processor 305 for example can crawl the web for repositories that include components, and normalize those components, prepare hashes of those components, and store those hashes into the known fingerprint library 319 together with identifying information that indicates the source of the known component (such as a UID or a component ID from a MAVEN source repository, or similar). It is anticipated that large numbers of components will have their fingerprints added to the known fingerprint library 319.

The processor 305 may include a temporary memory 351 for storing fingerprints that are being worked on, such as fingerprints of the unknown component 363 and its internal components.

As will be understood in this field, besides the functions discussed above, the memory 311 can include other miscellaneous information in a misc. database 347, along with the usual temporary storage and other instructions for other programs not considered herein.

The computer 301 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 305, memory 311, a disk drive and/or removable storage medium are referred to as "computer-readable storage media" and provide non-transitory storage of computer programs and data.

It should be understood that FIG. 3 is described in connection with logical groupings of functions or resources. One or more of these logical groupings may be omitted from one or more embodiments, for example, the functionality preparing the fingerprints library by getting 347 a known component, preparing the hash, and adding to known fingerprints can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 4:
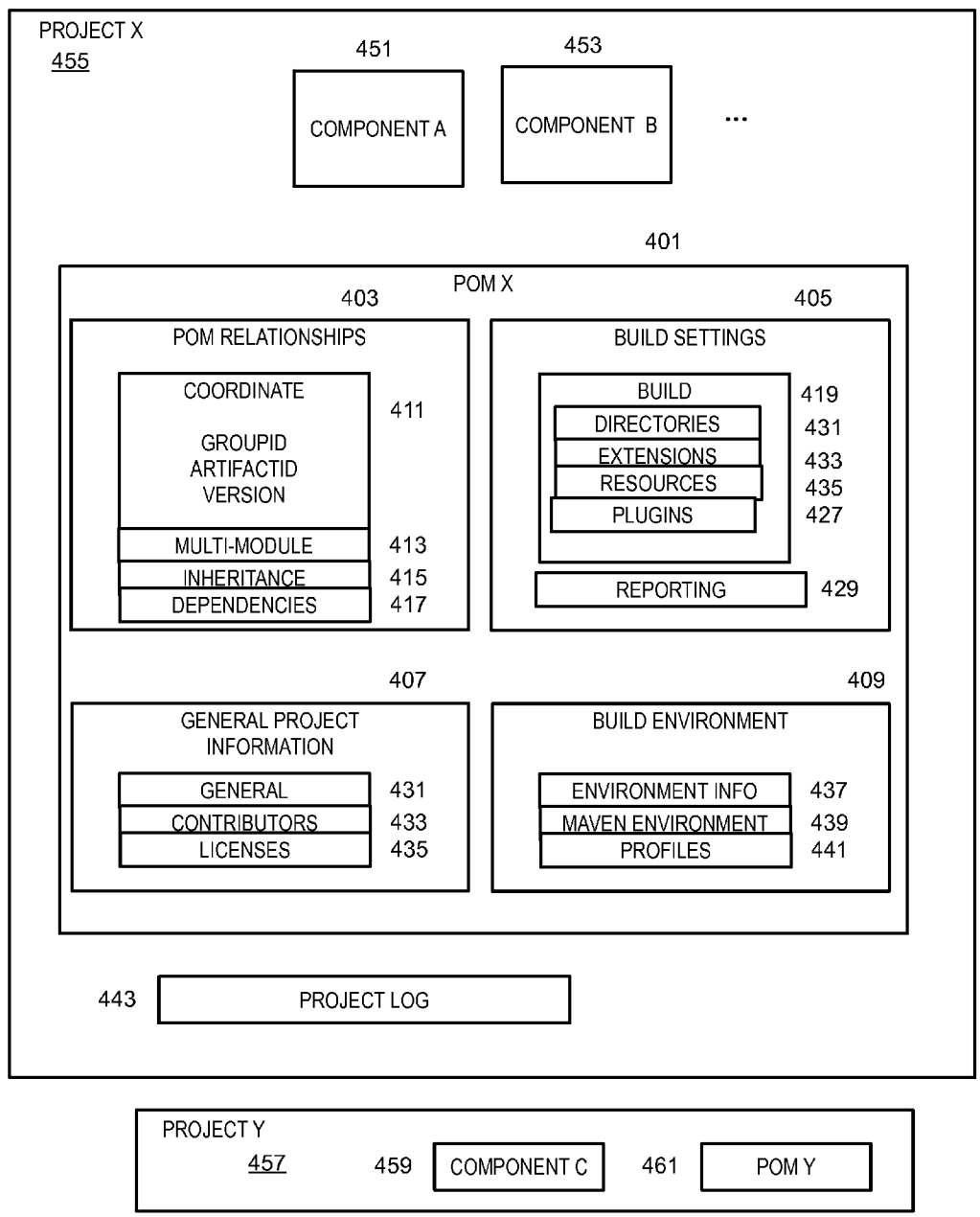
FIG. 4 is a block diagram illustrating a software repository.

Referring now to FIG. 4, a block diagram illustrating a software repository will be discussed and described. FIG. 4 discloses a project object model ("POM"). The project, e.g., project X 455 includes one or more components (here represented by Components A and B 451, 453), the project log 443 for Project X, and metadata for the project X (here represented by POM X 401) that identifies project information such as contributors 433 and licenses 435. The illustrated example is a known Maven software (currently available at Apache) project object model, which provides a highly structured handling of projects and components, sometimes referred to therein as "artifacts". Maven is a build management tool that comprises a project object model ("POM"), a set of standards, a project lifecycle, a dependency management system, and logic for executing plugin goals at defined phases in a lifecycle.

A "Project Object Model" (POM), e.g., POM X 401 is a file provided for a project 455 that describes, configures and customizes an application and is associated with one or more components by being included in the same directory as one or more components. In different build tools or project management tools, the POM 401 is a file included in a project, e.g., project X 455, which includes one or more components (represented by component A and component B 451, 453); the POM can be a file with a pre-determined name: a Maven pom.xml file, a GNU Makefile, or an Ant build.xml file. The POM file is typically targeted to Java applications, building JAR components, C# sources, or the like. A software component can be associated with a POM in alternative ways, for example, by including a link or identification of the associated POM.

The POM 401 can contain description data and configuration data: POM relationships 403, build setting 405, general project information 407, and build environment 409. General project information 407 includes general data 431 (project's name, the URL for a project, the sponsoring organization), a list of developers and contributors 433, and/or the license (or identifiers of licenses) for the project 455.

The build settings 405 for the project 455 can customize the behavior of a build 419 by specifying location of directories 421, extensions 423, resources 425 and plugins 427. Also, the build settings 405 can specify reporting 429 to be used for the POM 401.

The build environment 409 can include settings and profiles that can be activated when the software comprising the components 451 is built for use in different environments. For example, during development the built software is deployed to a development server, whereas in production developers the built software is deployed to a production server. This example provides build environment information 437, Maven environment information 439, and profiles 441 to be used in different builds. Techniques for executing a build of software are known.

The POM relationships 403 include POM coordinates 411 that specify a group ID, an artifact ID, and a version number for the project 455 and for the POM 401. In the conventional Maven system, group ID, artifact ID and version (GAV) uniquely identify each component. The group ID is meant to identify the individual or organization that published the component. The artifact ID uniquely identifies a component for the Group, and in accordance with known techniques indicates what functionality the component is addressed to; artifact IDs need not be unique for different groups. The version is the temporal axis for how a component changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies a component and allows its dependencies and relationship to other components to be tracked. The use of the GAV disambiguates amongst components across various domains of different groups.

The POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project, e.g., project X 455 can have a parent, e.g., project Y 457. Project Y 457 is illustrated to include representative component C 459 and a POM Y 461. Values which are not specified in the POM in a child project can inherit values from the POM of a parent project, e.g., when general project information 407 is not specified in the POM X 401 of Project X 455, the project X 455 can inherit the general project information specified in the POM Y 461 of the parent project Y 457.

Also included in a project 455 is a project log 443. The project log 443 can perform known functions, such as recording source code check-in, check-out, update of a component, download of a component from the project, bugs and related fixes specifying, and similar.

A different project, e.g., project Y 457 includes other components (here represented by Component C 459), the project log (not illustrated) for Project Y, and metadata for the project Y (here represented by POM Y 461) that identifies project information such as contributors and licenses.

It is not necessary to use a POM structure according to Maven; alternative implementations of a software repository as a database which includes components, their associated licenses and/or build information and the like will be understood.

Figure 5:
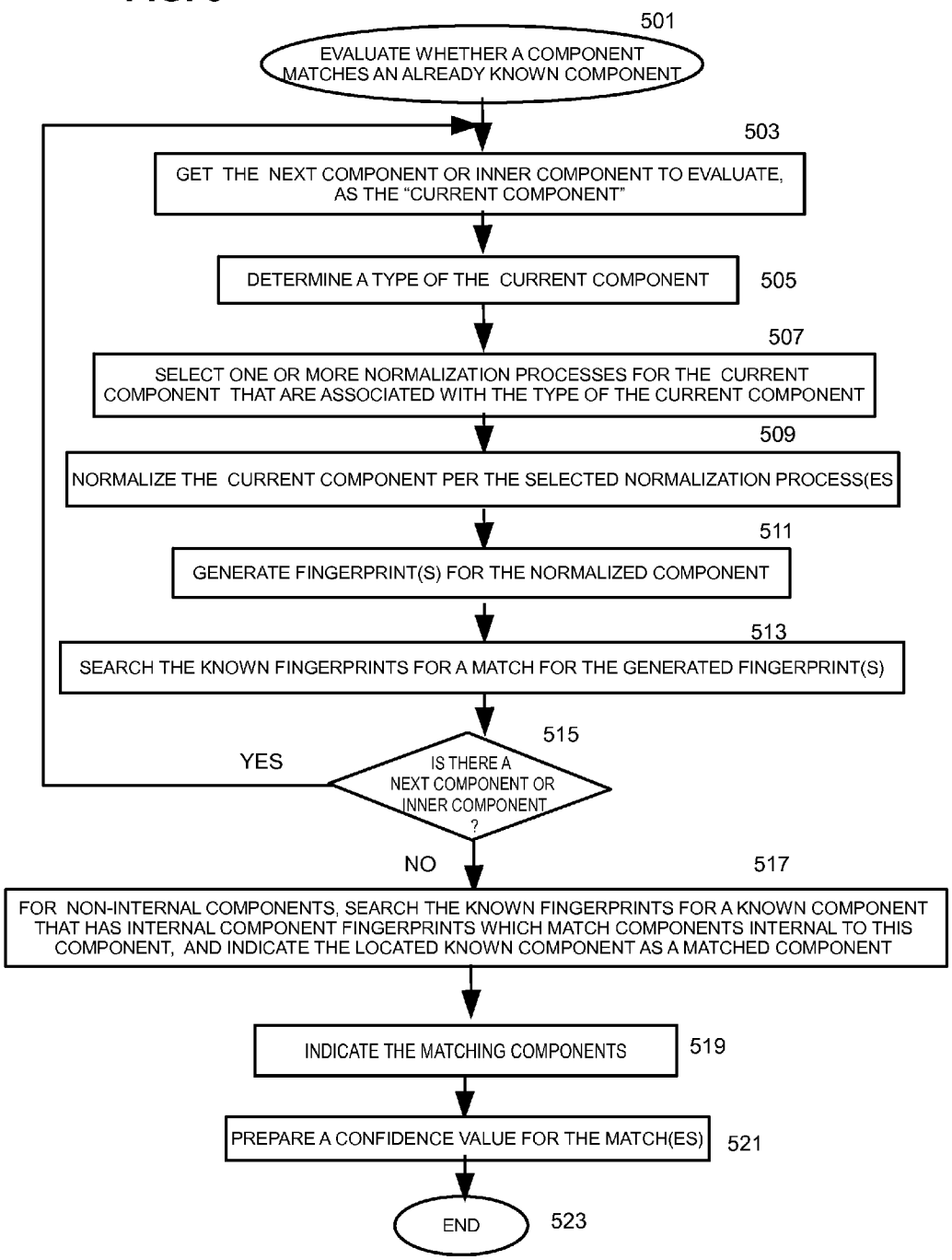
FIG. 5 is a flow chart illustrating a procedure to evaluate whether a component matches an already known component.
Figure 6:
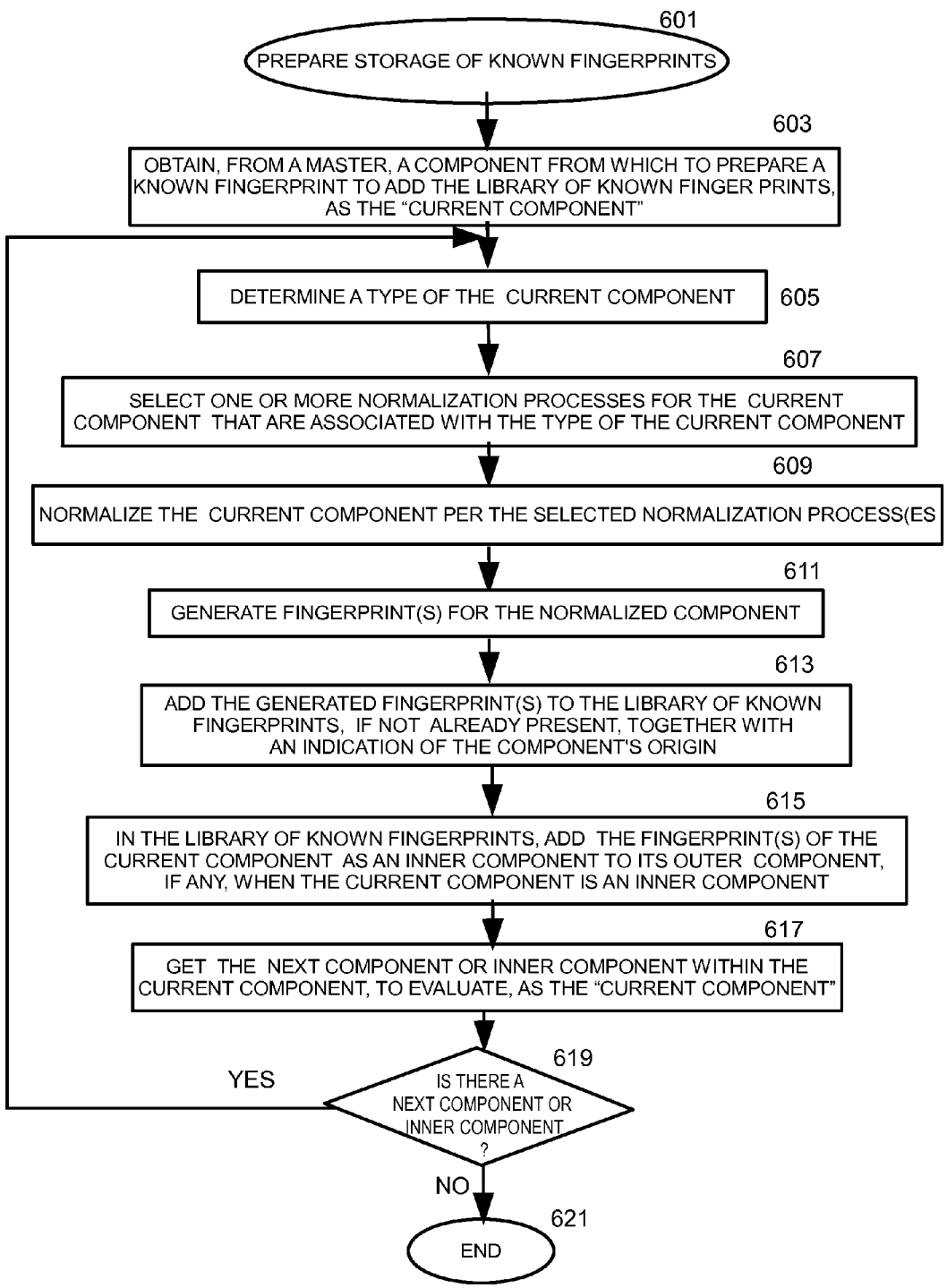
FIG. 6 is a flow chart illustrating a procedure to prepare the dataset of known fingerprints.
Figure 7:
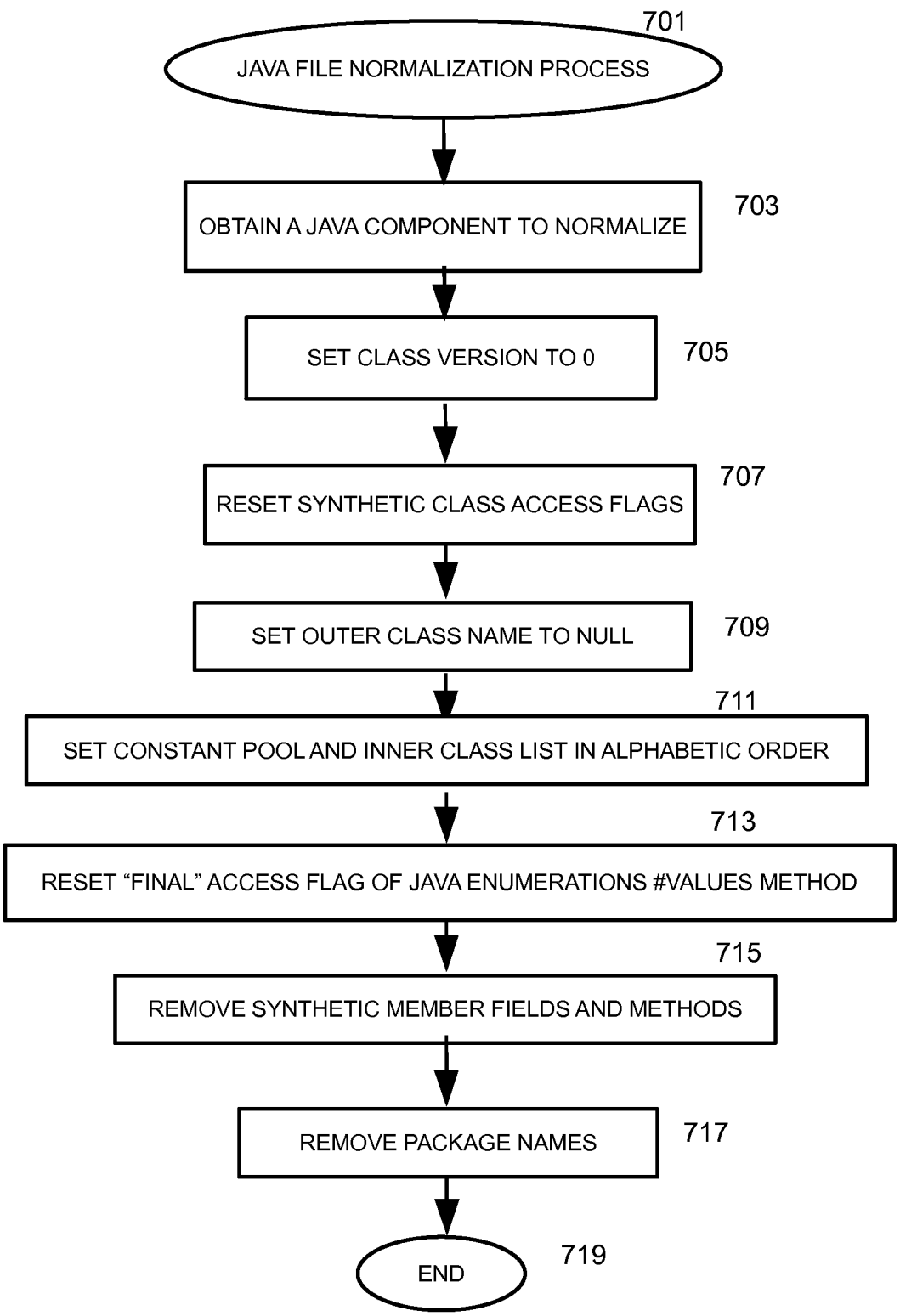
FIG. 7 is a flow chart illustrating a procedure to normalize a Java component.

FIG. 5, FIG. 6 and FIG. 7 are flow charts illustrating various procedures related to the above. Any or all of the illustrated procedures can advantageously be implemented on, for example, a processor of a controller, described in connection with FIG. 3 or other apparatus appropriately arranged.

Referring now to FIG. 5, a flow chart illustrating a procedure 501 to evaluate whether a component matches an already known component will be discussed and described. Many of the relevant details have already been discussed, so this provides an overview. In overview, the procedure 501 includes to get the next component 503 as the "current component", to determine 505 a type of the current component, to select 507 a normalization process for the type of the current component, to normalize 509 the current component per the normalization process that was selected, to generate 511 a fingerprint for the normalized component, to search 513 the known fingerprints for a match. This can be repeated until all of the components in the unknown component 515 are processed. Also, the procedure 501 can search 517 for a known fingerprint that has a combination of internal fingerprints which is similar to the combination of internal fingerprints of the unknown component. The procedure 501 can indicate 519 the matching components. Also, the procedure 501 can prepare 521 a confidence value for one or more of the matching components, which indicates the confidence that the unknown component (or its internal components) matches the known component(s). The process can finish 523 when evaluation of the unknown component is complete.

The order indicated is not so important, provided that a component is normalized before its fingerprint is generated, and the fingerprint is generated before it is matched.

Referring now to FIG. 6, a flow chart illustrating a procedure 601 to prepare the dataset of known fingerprints will be discussed and described. Many of the relevant details have already been discussed, so this provides an overview. In overview, the procedure 601 includes to obtain 603 a component from which to prepare a known fingerprint to add to the library of known fingerprints, to determine a type of the current component, to select one or more normalization processes for the component that are associated with the current component's type, to normalize 609 the component per the selected normalization process(es), to generate 611 the fingerprint(s) for the normalized component, to add 613 the generated fingerprint(s) to the library of known fingerprints (if not already present) together with identification information regard the known component's origin. Also, the procedure 601 can include information indicating the known components and their inner components. Thus, the procedure 601 can add the fingerprint(s) of the component as an inner component to its outer component, if any. The procedure can be repeated 619 for the inner component of the current component until all of the inner components have been fingerprinted and stored. The process can return when done 621.

Referring now to FIG. 7, a flow chart illustrating a procedure to normalize a Java component will be discussed and described. This is an example of a normalization process, which is performed when a component is determined to be a Java file.

In this Java file normalization procedure, the procedure 701 obtains 703 a Java component to be normalized. The Java component can be the outer component, or it can be one of the inner components. The following can be performed on the component, in any order. The procedure 701 can set 703 the class version to 0. The procedure 701 can reset 707 the synthetic class access flags. The procedure 701 can set 709 the outer class name to null. The procedure 701 can set 711 the constant pool and inner class list in alphabetic order. The procedure 710 can reset 713 the "final" access flag of the Java enumerations #values method. The procedure 701 can remove 715 the synthetic member fields and methods. The procedure 701 can remove 717 package names from the component. Then, the normalization procedure can end 719.

The data mentioned in the previous paragraph are known Java data fields. The pack200/unpack200 tools are known.

The above normalization procedure for the Java component can generate a universal fingerprint for a Java component. By "universal", it is intended to indicate that any data introduced into the Java component by software programmers while the semantic functional is retained, have been reduced by the normalization process, so that two Java components with the same provenance will match, regardless of subsequent compiles, packaging, etc.

Thus, one or more embodiments provides, for a Java component, normalizing the Java component according to a Java normalization process to provide a normalized Java component; and generating, in the processor, the fingerprint for the normalized Java component, as a universal fingerprint. In this embodiment, the fingerprint is a hash value; and the Java normalization process performs the following on the Java component: setting class version to 0, resetting synthetic class access flags, setting outer class name to null, setting constant pool and inner class list in alphabetical order, resetting final access flag of Java enumerations #values method, removing all synthetic member fields and Java methods, and removing all package names.

Example 1

Java Class Match Confidence Score

The following provides an example of scoring a matching confidence value for a Java class. In this example, there is an unknown class with one field and one method. The following hashes are calculated for this class.

The following normalizations can be performed on Java class file contents before calculation of hashes:
1. Class version set to 0. Class version varies depending on-target Java compiler parameter.
2. Reset synthetic class access flags. Different Java compilers set these flags differently.
3. Set 'outer' class name to null. Different Java compilers set this attribute differently.
4. Sort constant pool and inner class list in alphabetical order. pack200/unpack200 change the constant pool and inner class list order.
5. Reset 'final' access flag of Java enumerations #values method. Different Java compilers set this flag differently.
6. Remove all synthetic member fields and methods.

NOPKG_* hashes are calculated from input that has most fully-qualified Java class name references replaced with corresponding simple class name. For example, all references to "org.myproject.MyClass" are replaced with "MyClass". References to Java.* and Javax.* classes are preserved. This normalization can be performed in addition to other normalizations mentioned above.

BYTECODE, NOPKG_BYTECODE hash of entire Java class file contents

SIGNATURE, NOPKG_SIGNATURE hash of entire Java class file contents with method body instructions removed TYPE, NOPKG_TYPE hash of Java type declaration FIELD, NOPKG_FIELD hash of individual Java class file field METHOD_SIGNATURE, NOPKG_METHOD_SIGNATURE hash of individual Java class method signature METHOD, NOPKG_METHOD hash of individual Java class method, including method signature and body bytecode instructions.

For example, a Java class with one field and one method can have 12 hashes calculated for it:
BYTECODE
SIGNATURE
TYPE
NOPKG_BYTECODE
NOPKG_SIGNATURE
NOPKG_TYPE
FIELD
NOPKG_FIELD
METHOD_SIGNATURE
METHOD
NOPKG_METHOD_SIGNATURE
NOPKG_METHOD The relationship among these Java hashes confidence scores can be as follows:

Score(BYTECODE) > Score(NOPKG_BYTECODE) > Score(SIGNATURE) > Score(NOPKG_SIGNATURE)
Score(TYPE) + Sum(Score(FIELD)) + Sum(Score(METHOD_SIGNATURE)) + Sum(Score((METHOD)) == Score(BYTECODE)
Score(TYPE) + Sum(Score(FIELD)) + Sum(Score(METHOD_SIGNATURE)) == Score(SIGNATURE)
Score(NOPKG_TYPE) + Sum(Score(NOPKG_FIELD)) + Sum(Score(NOPKG_METHOD_SIGNATURE)) + Sum(Score((NOPKG_METHOD)) == Score(NOPKG_BYTECODE)
Score(NOPKG_TYPE) + Sum(Score(NOPKG_FIELD)) + Sum(Score(NOPKG_METHOD_SIGNATURE)) == Score(NOPKG_SIGNATURE)

The Java class match score can be calculated using the following rules.

For a known class C and unknown class U:

If the two classes match by BYTECODE hashes, match score is Score(BYTECODE).

Else, match score is calculated using the following formula and similar formula using corresponding NOPKG_hashes (not shown) and the highest of the two scores is used $$\frac{M(\text{TYPE}) + M(\text{FIELD}) + M(METHODSIGNATURE)}{1 + C(\text{FIELD}) + C(METHODSIGNATURE)}$$

$$Score(SIGNATURE) +$$

$$\frac{M(\text{METHOD})}{C(\text{METHOD})} Score(BYTECODE - \text{SIGNATURE})$$

where M(type) is the number of matching hashes of given type, C(type) is the total number of hashes of given type in unknown class U and Score(type) is match score of the given hash type.

An example Java class match score calculation is provided. For this example, assume the following baseline match scores

| | |
|---|---|
| 99 | BYTECODE |
| 98 | SIGNATURE |
| 51 | NOPKG_BYTECODE |
| 50 | NOPKG_SIGNATURE |

Take an unknown class U and known class C

```
class U {
  field u_fl;
  method u_m1;
}
class C {
  field c_fl;
  method c_m1;
}
```

If both classes have the equal BYTECODE hash, the match is 99. However, if the two classes have different Java type signature, for example, U implements Serializable interface and C does not, but otherwise are the same, matching score is $$\frac{0+1+1}{1+1+1}51 + \frac{1}{1}(99-51) = 83$$

If the two classes have different package names, matching score is $$\frac{1+1+1}{1+1+1}50 + \frac{1}{1}48 = 98$$

Example 2

Simple Example

This a simple example to illustrate the principles discussed herein. In this simple example, an unknown component has subcomponents A, B and C; and a known component has subcomponents B and C which are in the library of fingerprints for known components. The system generates a fingerprint for A, fingerprint for B, fingerprint for C, and fingerprint for unknown component (in addition to determining what kind of a file it is, and normalizing as discussed above). The system checks the library of known fingerprints for any match to fingerprint A, fingerprint B, fingerprint C, and/or component level fingerprint. In this example, subcomponent A was completely original and hence there is no matching fingerprint in the library. The system will determine that there is a match for fingerprint B and fingerprint C, but no match for fingerprint A and component level fingerprint. Then the system assigns a confidence to the match; the confidence level of A, B and C (lowest level) is higher than the confidence level for the overall match (to avoid double-counting the lack of match for A). The confidence level of, e.g., 66%, indicates the confidence for unknown component matching the known component. Optionally, the confidence level can also indicate the matching of subelements B and C. This will be useful for, for example, security vulnerabilities.

Also, what if B and C came together from another component? If B and C happen to be class files, then the system would be looking for other JAR files that have those class files. If B and C happen to be JAR files, the system ultimately would be trying to figure out what, exactly, are B and C? This complication is caused because the system can be matching at multiple different levels in some cases.

Example 3

Simple Example

A second example is the same as the first example except that subcomponent A was known and previously finger-printed, and the system found that 90 out of 100 files inside A match those files in component F. The system can indicate that subcomponent A potentially is component F, with the licensing and security implications of component F, because most of the things inside subcomponent A match component F.

These situations may occur when a developer has modified a component, or a developer has taken several components and put them together into a new component, etc.

Misc. Variation 1

Different normalization processes can be provided for files. Also, normalization processes can be provided for other file types besides Java, to be used for normalizing components of other files types. The techniques used to produce the normalizing processes for Java can be extrapolated to other languages. In one example, a similar approach can be developed to omit from a component, information which is not semantically important. For example, by looking at the binary output for .NET components and observing which types of things within a .NET component change based on the compiler or the time, this information can be factored out to produce a fingerprint that is still unique if those things are taken out.

The specific normalizations can be applied to other languages and other types of files. In developing the normalization for the other file type, one can look at the binary files and understand what they are built out of, what the sections are, and can identify certain sections as not contributing to the uniqueness of the file but which change every time (e.g., the time). In effect, this omits the "noise". The system can remove this information from that file and other files of the same type. This is why different normalizations that are applied have different confidence levels.

In one case, the format of a file can allow for expressing the same thing. For example, there are certain data structures inside a Java class file that do not require a particular order of elements, so it doesn't matter what order the elements are present. As far as execution of the file, it will be exactly the same. Different compilers have these structures in a different order. This would be noise.

In another example, there might be a modification, such as by a developer to a well-known open source component and that produced binary version of that modified component. In this case, there will be real differences in the class files. When the comparison is made, e.g., method bodies are thrown away during the normalization (referred to as "noise" for lack of a better term). That is, information is thrown away from the file so that there still is a meaningful but coarse grained assessment whether the files are similar or not.

In normalization, in some cases the system can change the order of elements when it is known that the order is insignificant or less significant. In another normalization, elements are discarded. When the order is changed, some information is lost but not much. When elements are discarded, more information is lost. As information is lost through normalization, the confidence of the match can decrease.

In summary, to develop a normalization process, the file can be broken down into structures and then it can be determined which of the structures do not contribute meaningfully to the match and other parts of the structure do. The structures that do contribute meaningfully to the match can be retained in the normalized file. For example, in a class file, the things that define the variables and the execution matter, whereas the order of some of the other things in the class file does not matter, so that the initial structure does not matter. As another example, pieces of the file that are random, e.g., based on how or when it was compiled, do not contribute in a meaningful way to the component or the match.

Misc. Variation 2

Multiple fingerprints can be generated for the same component, using different normalization processes because the different normalization processes omit different, potentially useful information. The different normalization techniques that are applied can have different confidence levels.

Misc. Variation 3

A file type, which can be used to determine the appropriate normalization process, can be determined from the file extension (which is a quick determination) and/or the file content (to make sure the file corresponds to the expected file type). For example, the file type can be determined from the file extension as confirmed by the file content.

Misc. Variation 4—UberJar

Sometimes software developers aggregate multiple input components into a single stand alone JAR file which is sometimes referred to as an UberJar. An "UberJar" is a single component into which the contents of many components have been unpacked and then reassembled. An example of an UberJar is two JAR files which are unzipped, and then rezipped into a new zipped file which is the UberJar.

There are UberJars that are present in source repositories of known components that the system is scanning (e.g., for developing the data set), and also in applications themselves that are being evaluated for a match might include an UberJar. In order to distinguish among UberJars of unknown components, an UberJar can be punished when scored so the UberJar is scored lower in the confidence calculation, than the original components they were created from.

A known UberJar plug-in can package components and their dependencies into a single JAR file, add bootstrap code to enable a main class to be invoked, load dependencies, execute a main method, enable dependent JARs to be inserted into the classpath, and locate the JARs, all within the UberJar. Thus, a software developer can take components A and B that might not be related and package them into an UberJar.

Because the UberJar typically represents an arbitrary software developer convenience, and not a-construct related to the actual product, there is no reason to increase the confidence level already provided by its contents matching, when UberJar hashes match.

Security risk of a software component is referred to herein, and generally encompasses software vulnerabilities and security. The Mitre CVE (Common Vulnerabilities and Exposures) list and NIST NVD (National Vulnerability Database) and other organizations conventionally provide text information about vulnerabilities and security of commercial software applications. The CVE list and NVD database indicate commercial software application names and versions or version ranges which may or may not readily map to software components. Furthermore, the CVE and NVD rating of vulnerabilities is based on the seriousness of the vulnerability.

Licenses are referred to herein. Well known in the open source field is that a license can be associated with a component. The method or system can collect the identity of the license or the content of the license, which is listed for example in the project such as in the POM associated with the component. The license further can indicate permitted and prohibited activities. (There are a several pre-determined open-source licenses in common use as well as variations thereof, as well as some customized licenses.)

The detailed descriptions which appear above may be presented in terms of program procedures executed on a computer or network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system that identifies components, comprising:
  a component fingerprint storage configured to memorize known fingerprints of known components; and
  a processor cooperatively operable with the component fingerprint storage, and configured to facilitate:
    determining all components included within an unknown component;
    generating fingerprints for all components determined to be included in the unknown component;
    determining whether any of the fingerprints generated for the components included in the unknown component match any of the known fingerprints of known components;
    determining whether the unknown component matches any of the known components based on matching of the known fingerprints of the components included in the unknown component; and
    preparing a matching confidence value based on matching of the unknown component and all of the components determined to be included in the unknown component to any of the known fingerprints, wherein the matching confidence value expresses a level of confidence that the unknown component and a known component which is associated with a matched one of the known fingerprints are the same.

2. The computer system of claim 1, further comprising generating the known fingerprints of known components and then storing the known fingerprints in the component fingerprint storage.

3. The computer system of claim 1, wherein the fingerprints are hash values.

4. The computer system of claim 1, further comprising normalizing the unknown component and all of the components included in the unknown component, before generating the fingerprints for the unknown component and the components included in the unknown component.

5. The computer system of claim 4, further comprising
  for each of the components in the unknown component, before normalizing the component, determining a type of the component and determining a normalization process associated with the type of the component,
  wherein the component is normalized according to the normalization process determined to be associated with the type of the component.

6. A computer-implemented method for identifying a component, comprising:
  memorizing, in a component fingerprint storage, known fingerprints of known components;
  determining, in a processor, all components included within an unknown component;
  generating, in the processor, fingerprints for all components determined to be included in the unknown component;
  determining, in the processor, whether any of the fingerprints generated for the components included in the unknown component match any of the known fingerprints of known components of the component fingerprint storage;
  determining, in the processor, whether the unknown component matches an of the known components based on matching of the known fingerprints of the components included in the unknown component; and
  preparing a matching confidence value based on matching of the unknown component and all of the components determined to be included in the unknown component to any of the known fingerprints, wherein the matching confidence value expresses a level of confidence that the unknown component and a known component which is associated with a matched one of the known fingerprints are the same.

7. The method of claim 6, further comprising generating the known fingerprints of known components and then storing the known fingerprints in the component fingerprint storage.

8. The method of claim 6, wherein the fingerprints are hash values.

9. The method of claim 6, further comprising normalizing the unknown component and all of the components included in the unknown component, before generating the fingerprints for the unknown component and the components included in the unknown component.

10. The method of claim 9, further comprising
  for each of the components in the unknown component, before normalizing the component, determining a type of the component and determining a normalization process associated with the type of the component,
  wherein the component is normalized according to the normalization process determined to be associated with the type of the component.

11. A non-transitory computer-readable medium comprising instructions for execution by a computer, the instructions including a computer-implemented method for identifying a component, the instructions for implementing:
  memorizing, in a component fingerprint storage, known fingerprints of known components;
  determining, in a processor, all components included within an unknown component;
  generating, in the processor, fingerprints for all components determined to be included in the unknown component;
  determining, in the processor, whether any of the fingerprints generated for the components included in the unknown component match any of the known fingerprints of known components of the component fingerprint storage;
  determining, in the processor, whether the unknown component matches any of the known components based on matching of the known fingerprints of the components included in the unknown component; and
  preparing a matching confidence value based on matching of the unknown component and all of the components determined to be included in the unknown component to any of the known fingerprints, wherein the matching confidence value expresses a level of confidence that the unknown component and a known component which is associated with a matched one of the known fingerprints are the same.

12. The non-transitory computer-readable medium of claim 11, further comprising generating the known fingerprints of known components and then storing the known fingerprints in the component fingerprint storage.

13. The non-transitory computer-readable medium of claim 11, wherein the fingerprints are hash values.

14. The non-transitory computer-readable medium of claim 11, further comprising normalizing the unknown component and all of the components included in the unknown component, before generating the fingerprints for the unknown component and the components included in the unknown component.

15. The non-transitory computer-readable medium of claim 14, further comprising
for each of the components in the unknown component, before normalizing the component, determining a type of the component and determining a normalization process associated with the type of the component,
wherein the component is normalized according to the normalization process determined to be associated with the type of the component.

* * * * *